US012718569B2

(12) United States Patent
Wu et al.

(10) Patent No.: US 12,718,569 B2
(45) Date of Patent: Aug. 25, 2026

(54) DETECTION METHOD AND DETECTION DEVICE FOR DETECTING FAULT OF INSULATOR DISCHARGE BASED ON IMAGE RECOGNITION

(71) Applicants: State Grid Hubei Extra High Voltage Company, Wuhan (CN); Hubei Superenergic Electric Power Co., Ltd., Wuhan (CN)

(72) Inventors: Jun Wu, Wuhan (CN); Shenli Wang, Wuhan (CN); Xiangdong Wu, Wuhan (CN); Xiangkui He, Wuhan (CN); Quan Fang, Wuhan (CN); Huaqiao Xiang, Wuhan (CN); Xun Zhang, Wuhan (CN); Xiaohui Wei, Wuhan (CN)

(73) Assignees: State Grid Hubei Extra High Voltage Company, Wuhan (CN); Hubei Superenergic Electric Power Co., Ltd., Wuhan (CN)

( * ) Notice: Subject to any disclaimer, the term of this patent is extended or adjusted under 35 U.S.C. 154(b) by 206 days.

(21) Appl. No.: 18/766,874

(22) Filed: Jul. 9, 2024

(65) Prior Publication Data

US 2025/0139972 A1 May 1, 2025

(30) Foreign Application Priority Data

Oct. 27, 2023 (CN) ......................... 202311421670.6

(51) Int. Cl.
*G06V 20/50* (2022.01)
*G06V 10/77* (2022.01)
(Continued)

(52) U.S. Cl.
CPC .......... *G06V 20/50* (2022.01); *G06V 10/7715* (2022.01); *G06V 10/774* (2022.01); *G06V 10/82* (2022.01); *G06V 10/806* (2022.01)

(58) Field of Classification Search
CPC .... G06V 20/50; G06V 10/7715; G06V 10/82; G06V 10/774; G06V 10/806; G06V 10/40; G06V 10/764; G01R 31/1245
See application file for complete search history.

(56) References Cited

U.S. PATENT DOCUMENTS 7,030,621 B2 * 4/2006 Sarkozi .............. G01R 31/1272 324/544

FOREIGN PATENT DOCUMENTS

CN 103440497 A * 12/2013 ............... G06K 9/62
CN 104331701 A * 2/2015 ......... G06F 18/2155
(Continued)

OTHER PUBLICATIONS

Davari et al., 2021, "Intelligent Diagnosis of Incipient Fault in Power distribution Lines Based on Corona Detection in UV-Visible Videos" (pp. 3640-3648) (Year: 2021).*
(Continued)

*Primary Examiner* — Manav Seth
(74) *Attorney, Agent, or Firm* — Cooper Legal Group, LLC

(57) ABSTRACT

A detection method for detecting fault of insulator discharge based on image recognition includes the following steps: building an ultraviolet image dataset for an electrical equipment, building a neural network model for insulator discharge detection based on YOLOV5-T, the neural network model includes a CBS module, a CST module, a Concat module, a 1D-attention module, an Upsample module and a Detect module, training the neural network model by utilizing the ultraviolet image dataset for the electrical equip-
(Continued)

ment, to obtain a trained neural network model, and inputting images to be recognized into the trained neural network model, to obtain fault detection results. A detection device is configured to implement the detection method.

5 Claims, 4 Drawing Sheets

(51) Int. Cl.

| | |
|---|---|
| ***G06V 10/774*** | (2022.01) |
| ***G06V 10/82*** | (2022.01) |
| *G06V 10/80* | (2022.01) |

(56) References Cited

FOREIGN PATENT DOCUMENTS

| | | | | |
|---|---|---|---|---|
| CN | 109145961 A | * | 1/2019 | ............. G06F 18/24 |
| CN | 113238131 A | * | 8/2021 | ......... G01R 31/1218 |
| CN | 112861952 B | * | 4/2023 | ........... G06V 10/751 |
| EP | 2725367 B1 | * | 4/2020 | ......... G01R 31/1227 |

OTHER PUBLICATIONS

Qi et al., May 2023, “Research on an Insulator Defect Detection Method Based on Improved YOLOv5” (pp. 1-15) (Year: 2023).*

* cited by examiner

DETECTION METHOD AND DETECTION DEVICE FOR DETECTING FAULT OF INSULATOR DISCHARGE BASED ON IMAGE RECOGNITION

CROSS-REFERENCE TO RELATED APPLICATION

The present application is based on and claims the priority benefits of China application No. 202311421670.6, filed on Oct. 27, 2023. The entirety of China application No. 202311421670.6 is hereby incorporated by reference herein and made a part of this specification.

TECHNICAL FIELD

The present application relates to a technical field of image recognition, and in particular, relates to a detection method and detection device for detecting fault of insulator discharge based on image recognition.

BACKGROUND ART

Fault of insulator discharge is one of common types of faults in a power system, which may lead to performance degradation or even damage of power equipment, and have negative impacts on the stable operation and security of the power system. Therefore, early detection and diagnosis of the fault of insulator discharge are crucial for the operation and maintenance of the power system.

The traditional detection method for detecting fault of insulator discharge mainly relies on manual inspection, however, this method has deficiencies such as large workload, low efficiency and strong subjectivity. In order to overcome these deficiencies, a detection method for detecting fault of insulator discharge based on image recognition emerges.

Through automated image processing and machine learning techniques, a fast and accurate detection on insulators in wide range can be achieved by this method. In this method, an image acquisition device with high resolution, such as an UV camera, is configured to obtain images on the surface of the insulator. These images can clearly display discharge phenomena on the surface of the insulator such as discharge sparks and discharge arcs. By preprocessing these images and extracting features therefrom in combination with the training of machine learning algorithms or deep learning models, a discharge fault classifier can be established, to determine whether there are faults of insulator discharge in the images.

The detection method for detecting fault of insulator discharge based on image recognition is characterized in automation, high efficiency and accuracy, which can greatly improve the detection efficiency and accuracy of faults of insulator while reducing the workload of manual inspection and risk.

However, there are still some issues and challenges to be solved. Forms and characteristics of faults of insulator discharge may be different due to factors such as insulator types, working conditions, and degree of fault. Therefore, a model must have certain generalization ability, to adapt to discharge faults detection requirements in different situations. It is necessary to sufficiently train different types of insulators and collect data thereof, to establish an accurate and reliable classifier. In the power system, a detection for detecting fault of insulator discharge usually requires to be performed in real time and to make rapid response to the detection results. Therefore, both the algorithms and the systems need to have efficient processing capabilities and quick response. Therefore, the utilization and optimization of the computing resources should be fully considered when designing algorithms and building systems, to ensure a rapid and accurate detection of fault of insulator discharge in the real-time applications. In addition, the quality and reliability of data are also one of the challenges faced by the detection method for detecting fault of insulator discharge based on image recognition. The image data may be influenced by environmental factors, noise interference, etc., which may affect the accuracy of detection results. Therefore, appropriate data processing and preprocessing methods need to be adopted to improve the quality and reliability of the data. The detection method for detecting fault of insulator discharge based on image recognition has great potential and application value, but it also faces some of above-mentioned problems and challenges.

SUMMARY

In order to involve the problems of low accuracy and weak scene adaptability of insulator discharge detection in existing technique, the present application provides a detection method for detecting fault of insulator discharge based on image recognition.

This method includes the following steps:

S1. building an ultraviolet image data set for an electrical equipment,

S2. building a neural network model for insulator discharge detection based on YOLOV5-T, the neural network model for insulator discharge detection based on YOLOV5-T includes a CBS module, a CST module, a Concat module, a 1D-attention module, an Upsample module and a Detect module, S3. training the neural network model for insulator discharge detection based on YOLOV5-T by utilizing the ultraviolet image data set for the electrical equipment, to obtain a trained neural network model, and S4. inputting images to be recognized into the trained neural network model, to obtain fault detection results.

The present application further provides a detection device for detecting fault of insulator discharge based on image recognition, including a processor and a memory, executable instructions are stored in the memory, and the processor is configured to load and execute the executable instructions in the memory, to implement the detection method for detecting fault of insulator discharge based on image recognition described above.

The beneficial effect provided by the present application is to improve the accuracy of insulator discharge detection and the applicability of detection scenarios.

DETAILED DESCRIPTION

Figure 1:
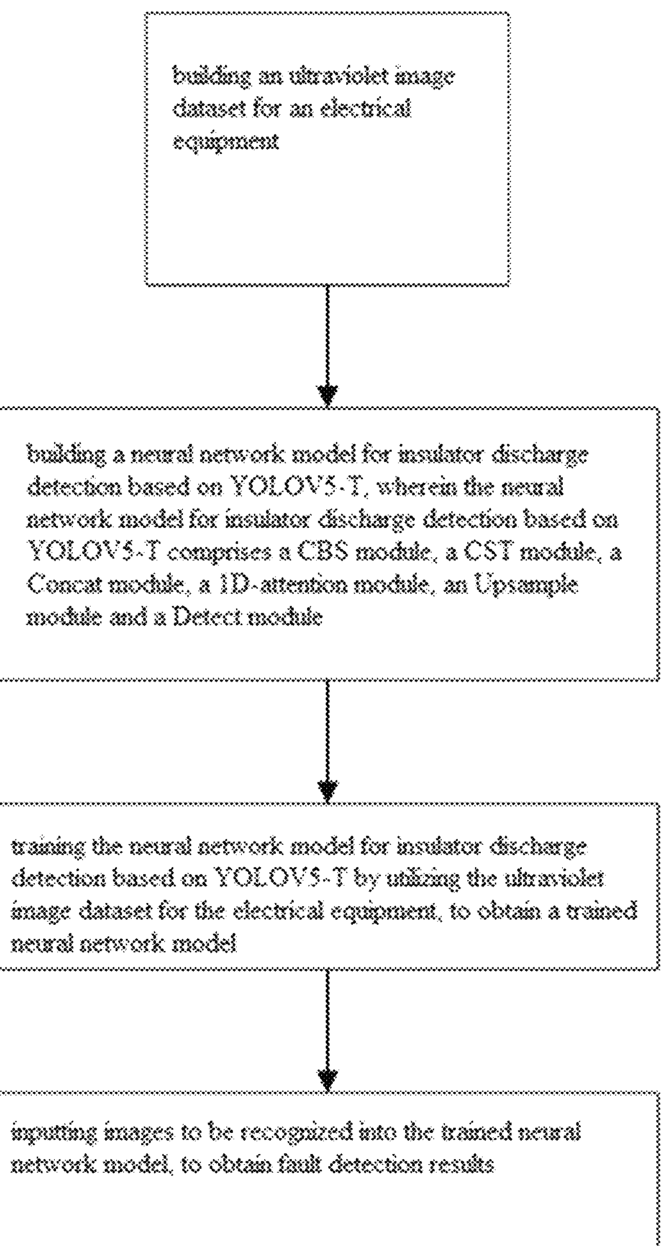
FIG. 1 is a schematic flow chart of the method of the present application.

In order to make the purpose, technical solution, and advantages of the present application clearer, the embodiments of the present application will be further described in conjunction with the accompanying drawings.

The present application provides a detection method for detecting fault of insulator discharge based on image recognition, including the following steps.

S1. Building an ultraviolet image dataset for an electrical equipment.

It should be noted that in the embodiment of the present application, a labeling tool is used to label the ultraviolet image dataset, and the ultraviolet image is labeled with a rectangular box, such as the label of a discharge area is "Discharge_region", the label of a discharge insulator is "Abnormal_insulator", and the label of a normal insulator is "insulator", to generate an XML annotation file. A labeled dataset is selected, on which a mosaic flipping, a rotation, an image interpolation, and other operations are performed to expand the dataset. At the same time, the dataset is divided into training sets, validation sets and testing sets by the ratio of 8:1:1.

S2. Building a neural network model for insulator discharge detection based on YOLOV5-T, the neural network model includes a CBS module, a CST module, a Concat module, a 1D-attention module, an Upsample module and a Detect module.

It should be noted that the CBS module (Cross-stage Partial Network) is a cross-stage partial network introduced in YOLOv5, and is configured to extract features of different scales, which can capture targets of different sizes at different levels.

The CST module is a model of convolution in combination with transformer, which is configured to combine local features extracted by CNN with the Transformer model, to fuse global information.

The Transformer model can capture global contextual correlations and semantic information through self-attention mechanism. This combination can help the model better understand overall semantics and correlations in the images.

The Upsample module is configured to perform an upsampling operation of the resolution of feature maps, so as to be concatenated with the feature maps with higher resolution, thereby improving the detection accuracy and precision.

The Concat module is configured to concatenate the feature maps at different levels, to obtain a richer feature representation.

The 1D-attention module is a one-dimensional attention mechanism, and is configured for self-attention calculation in the channel dimension of the feature maps, as well as in a spatial vertical dimension and a spatial horizontal dimension, to enhance the attention and response of the model to important features.

The Detect module is a detection module in YOLOv5, which is configured to predict the category and position of the target. It transforms the feature mapping extracted from the feature maps into a predicted result of the target by applying convolution and the fully connected layer.

By the YOLOv5-T model, an efficient detection and accurate localization of the target is achieved through different module combinations. Designs and combinations of these modules enable the model to perform excellently in target detection tasks and reach a better performance.

It should be noted that structure of the neural network model of the present application includes a Backbone network, a Neck network and a Head network.

The Backbone network: YOLOv5 uses CSTDarknet as the backbone network, which is a neural network of convolution in combination with transformer. CSTDarknet includes a series of convolutional layers, residual connections and Transformer modules for extracting image features.

The Neck network: a Neck section of YOLOv5-T mainly includes some convolutional layers, up-sampling operations, one-dimensional attention mechanisms, which are configured to fuse and up-sample the feature maps of different levels while performing a self-attention calculation in the channel dimension, the spatial vertical dimension and spatial horizontal dimension of the feature maps. These operations are helpful to improve the accuracy and precision of target detection.

The Head network: a Head section of YOLOv5-T is a core part of target detection, consisting of a series of convolutional layers and fully connected layers. The Head section is responsible for predicting the bounding box and category of the target. YOLOv5-T uses the detection means of "Anchor based", to predict the position and category of the target by applying a series of anchor boxes on the feature maps.

Figure 2:
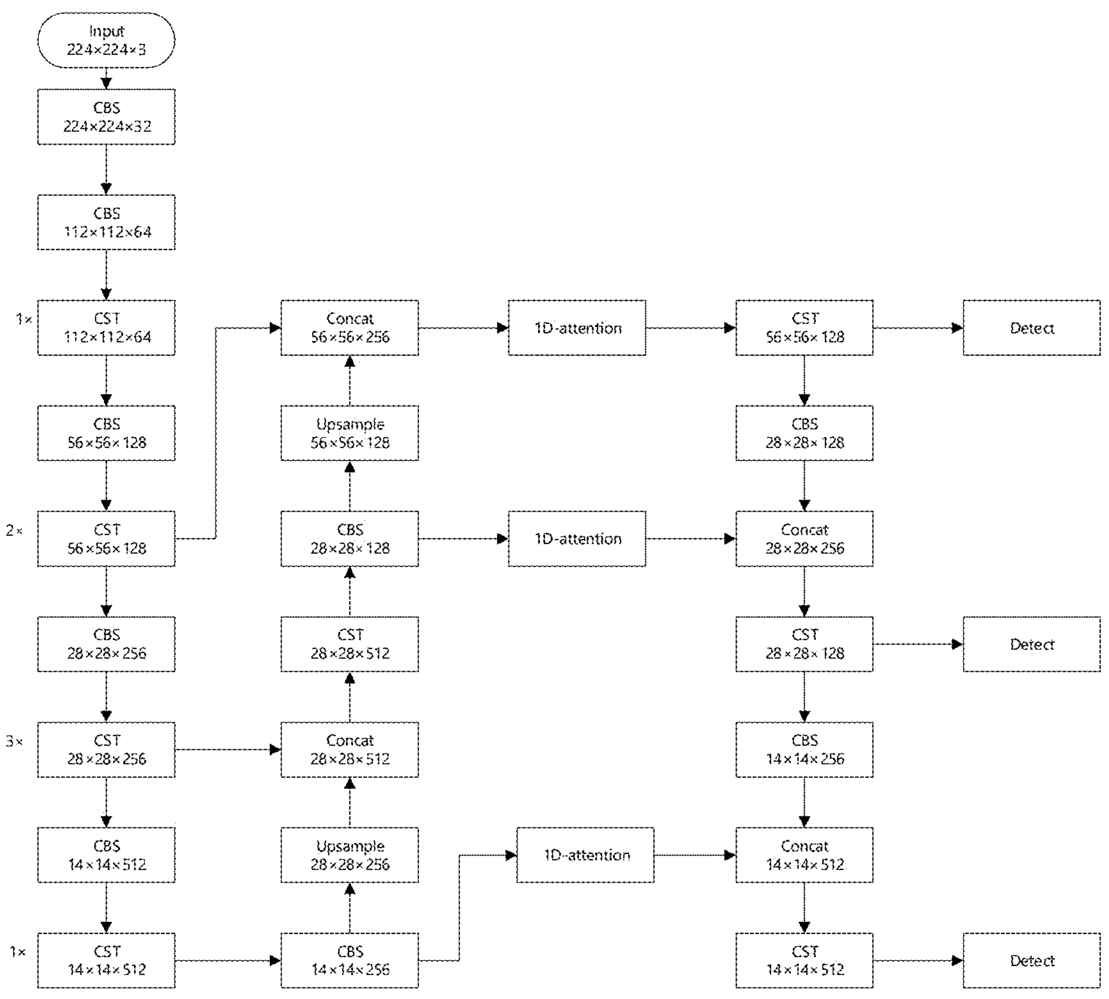
FIG. 2 is a schematic diagram showing the structure of a neural network of the present application.

Referring to FIG. 2, FIG. 2 is a schematic diagram showing the structure of the neural network of the present application.

As an embodiment, the Backbone network includes a first CBS module, a second CBS module, a third CBS module, a fourth CBS module and a fifth CBS module, and a first CST module, a second CST module, a third CST module and a fourth CST module.

The image is input to the first CBS module, an output port of the first CBS module is connected to an input port of the second CBS module; an output port of the second CBS module is connected to an input port of the first CST module; an output port of the first CST module is connected to an input port of the third CBS module; an output port of the third CBS module is connected to an input port of the second CST module; an output port of the second CST module is connected to an input port of the fourth CBS module; an output port of the fourth CBS module is connected to an input port of the third CST module; an output port of the third CST module is connected to an input port of the fifth CBS module; an output port of the fifth CBS module is connected to an input port of the fourth CST module.

The Neck module includes a first Concat module, a second Concat module, a third Concat module and a fourth Concat module, a first Upsample module to a second Upsample module, a sixth CBS module, a seventh CBS module, an eighth CBS module and a ninth CBS module, a fifth CST module, a sixth CST module, a seventh CST module and an eighth CST module, and a first 1D-attention module, a second 1D-attention module and a third 1D-attention module.

The output port of the second CST module is further connected to an input port of the first Concat module.

The output port of the third CST module is further connected to an input port of the second Concat module.

The output port of the fourth CST module is further connected to an input port of the seventh CBS module.

An output port of the seventh CBS module is connected to an input port of the second Upsample module; an output port of the second Upsample module is connected to the input port of the second Concat module; an output port of the second Concat module is connected to an input port of the fifth CST module; an output port of the fifth CST module is connected to an input port of the sixth CBS module; an output port of the sixth CBS module is connected to an input port of the first Upsample module; an output port of the first Upsample module is connected to the input port of the first Concat module.

An output port of the first Concat module is connected to an input port of the first 1D-attention module.

The output port of the sixth CBS module is further connected to an input port of the second 1D-attention module.

The output port of the seventh CBS module is further connected to an output port of the third 1D-attention module.

An output port of the first 1D-attention module is connected to an input port of the sixth CST module; an output port of the sixth CST module is connected to an input port of the eighth CBS module; an output port of the eighth CBS module is connected to an input port of the third Concat module; an output port of the third Concat module is connected to an input port of the seventh CST module; an output port of the seventh CST module is connected to an input port of the ninth CBS module; an output port of the ninth CBS module is connected to an input port of the fourth Concat module; an output port of the fourth Concat module is connected to an input port of the eighth CST module.

The Head network includes a first Detect module, a second Detect module and a third Detect module.

The output port of the sixth CST module is further connected to the first Detect module; the output port of the seventh CST module is further connected to the second Detect module; an output port of the eighth CST module is further connected to the third Detect module.

As an embodiment:

The Beckbone network: the backbone of YOLOv5-T starts with a network structure called CSTDarknet, which includes a series of convolutional layers and Transformer modules.

An input layer of this backbone receives an original image as input. In the CSTDarknet, the CBS module is configured to gradually reduce the size of the feature maps by stacking convolutional layers and Transformer modules, while the CST module is configured for extraction of image features. This structure can effectively capture semantic information, global features, and local features in the image.

In the CSTDarknet, five down-sampling operations are performed through CBS, and the CST module following the CBS module extracts features from the feature maps by stacking them at different times. The output of the CSTDarknet is three valid feature maps, with sizes of 56×56, 28×28 and 14×14, respectively. These feature maps have different resolutions and contain rich image features. These feature maps will then be passed into the Neck (feature fusion module) for further fusion of features of different levels, to obtain more global and multi-scale feature representations. This feature fusion operation is helpful to improve the accuracy and robustness of target detection. This design enables YOLOv5-T to have a better performance and effectiveness in target detection tasks.

The Neck network: in Neck, PANet is a key module configured to fuse feature maps at different levels. The multi-scale feature fusion is performed through up-sampling and feature fusion.

Specifically, FPN is configured to construct a high-level semantic feature map at all scales by means of a top-down detection, to construct a classic structure of a feature pyramid. After passing through multiple layers of networks, underlying target information becomes very blurry, so a bottom-up route is added into PAN, to compensate and strengthen the positioning information. A horizontal connection with the 1D-attention module is further introduced into a horizontal connection between FPN and PAN, to connect the low-level feature map with the high-resolution feature map of a higher layer. This horizontal connection can transmit more details and local information, provide more accurate target location ability, and a self-attention calculation is performed in the channel dimension, spatial vertical dimension and spatial horizontal dimension of the feature map, which enhances the attention and response of the model to important features, further improving the performance of target detection.

In the Neck, Upsample is configured to increase the resolution of the feature map, such that it has the same size as the feature maps at other levels. A bilinear interpolation is applied to perform the up-sampling. In addition, in the step of adjusting the channel number and down-sampling of the feature map, the CBS module is often used. The CST module is used for feature extraction during a feature extraction stage. CST can capture both semantic and spatial information of the feature map by simultaneously performing convolution operations on both channel and spatial dimensions. In addition, in order to further enhance the attention and response of the model to important features, a 1D-attention mechanism is adopted to achieve the spatial attention and channel attention. The 1D-attention enhances the attention of the model to the important features by performing the self-attention calculation in the channel dimension, spatial vertical dimension and horizontal dimension of the feature map. This attention mechanism can improve the performance of target detection, such that the model can locate the target more accurately.

The Head network: firstly, a series of convolutional layers are used to further extract features. These convolutional layers adopt 3×3 convolution kernels, to capture semantic and spatial information in the feature maps. The feature maps are converted into predicted results through the fully connected layer. Generally, the fully connected layer compresses the channel dimensions of the feature maps and outputs predicted results. For prediction of bounding boxes of the targets, a set of convolutional layers and the fully connected layers are usually used to output coordinates and confidence level of the bounding boxes. For prediction of the categories, a set of convolutional layers and the fully connected layers are usually used to output the probability of each category. In addition, Head of YOLOv5 further performs a post-processing on the predicted results, applies Non Maximum Suppression (NMS) to filter out the final detection results, and filters threshold according to the confidence level.

S3. Training the neural network model by utilizing the ultraviolet image dataset for the electrical equipment, to obtain a trained neural network model.

It should be noted that a loss function in the training of the neural network in the present application adopts the loss function of YOLOv5 Loss to measure difference between the predicted results and true labels.

The loss function includes location loss, classification loss, and target detection loss, and is configured to optimize the model and improve the detection accuracy.

A structure of YOLOv5-T includes a backbone network, a feature fusion layer, a detection head and a loss function. Such a structure design enables YOLOv5-T to have high performance and efficiency in target detection tasks.

S4. Inputting images to be recognized into the trained neural network model, to obtain fault detection results.

Figure 3:
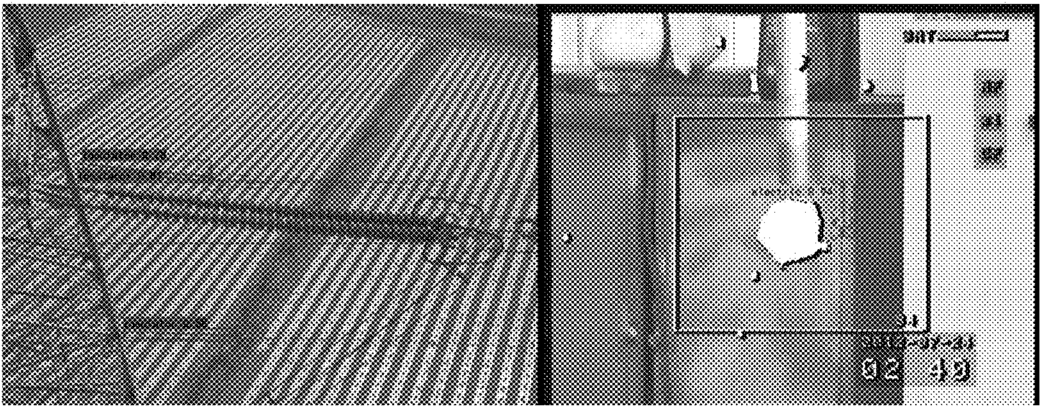
FIG. 3 is a schematic diagram showing the results of the first embodiment of the detection method in the present application.

As an embodiment, referring to FIG. 3, FIG. 3 is a schematic diagram showing results of the first embodiment of the detection method in the present application.

Figure 4:
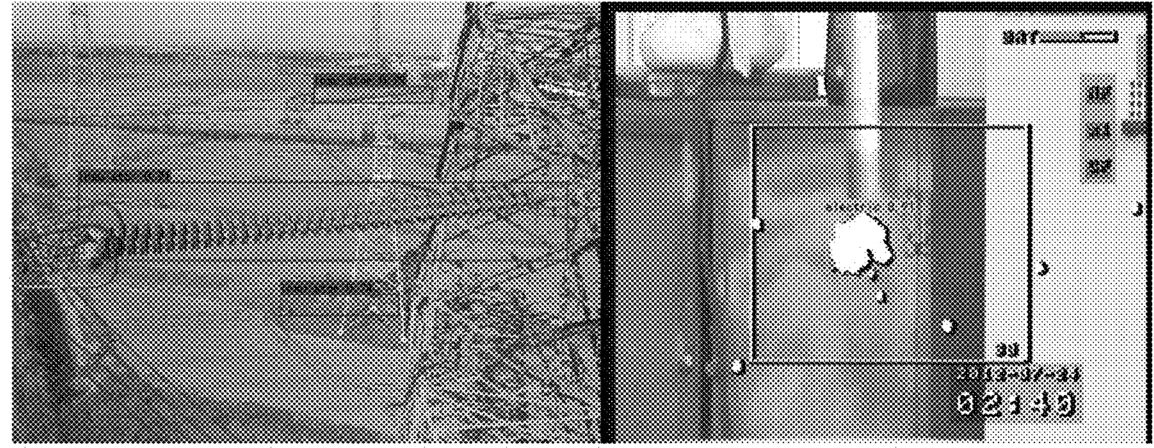
FIG. 4 is a schematic diagram showing the results of the second embodiment of the detection method in the present application.

As an embodiment, referring to FIG. 4, FIG. 4 is a schematic diagram showing results of the second embodiment of the detection method in the present application.

Figure 5:
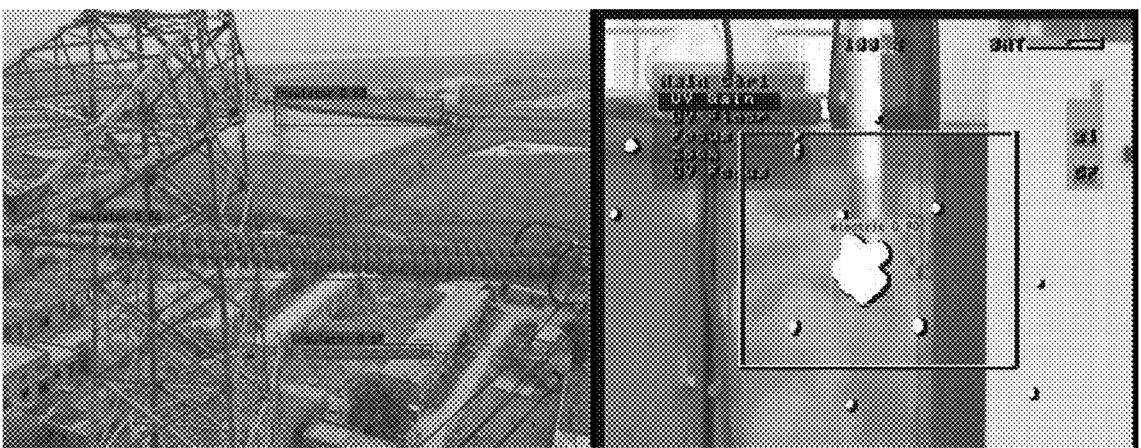
FIG. 5 is a schematic diagram showing the results of the third embodiment of the detection method in the present application.

As an embodiment, referring to FIG. 5, FIG. 5 is a schematic diagram showing results of the third embodiment of the detection method in the present application.

It should be noted that in FIGS. 3, 4 and 5, the left side schematically shows the identification and detection of the insulator string, while the right side schematically shows the detection of the fault of insulator discharge.

Finally, referring to Table 1, Table 1 provides a comparison of algorithm performance.

TABLE 1

Performance Comparison of Various Algorithms

| algorithms | mPA | F1 (insulator) | F1 (discharge) |
|---|---|---|---|
| YOLOv5s | 0.966 | 0.900 | 0.880 |
| YOLOv5-T (the present application) | 0.985 | 0.933 | 1.000 |

As shown in Table 1, the method of the present application has better detection performance compared to traditional methods.

Figure 6:
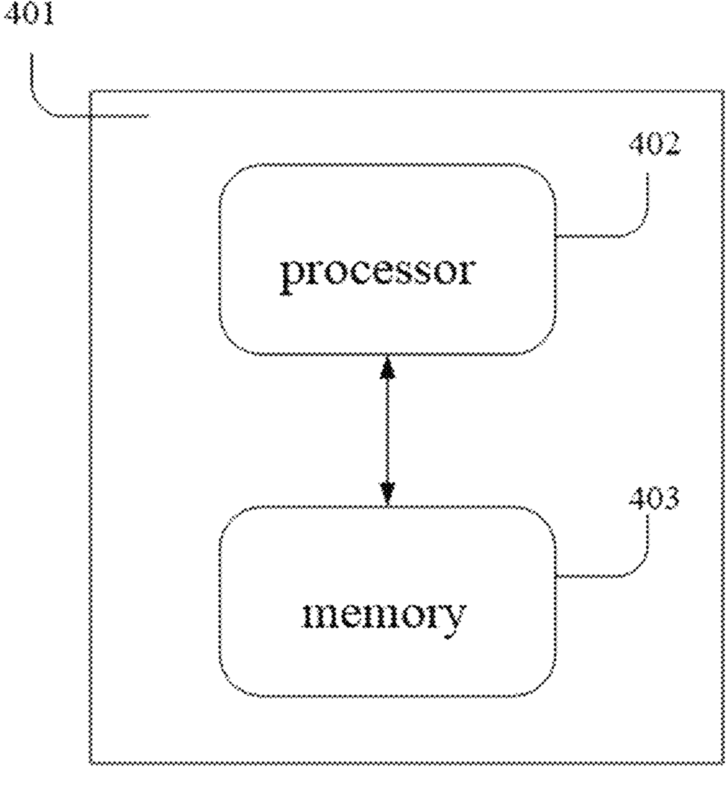
FIG. 6 is an operation schematic diagram of a detection device of the present application.

Referring to FIG. 6, FIG. 6 is an operation schematic diagram of a detection device in an embodiment of the present application, the detection device specifically includes a detection device 401, a processor 402 and a storage device 403.

The detection device 401: the detection device 401 is configured to implement a detection method for detecting fault of insulator discharge based on image recognition.

The processor 402: the processor 402 loads and executes instructions and data in the storage device 403, to implement the detection method for detecting fault of insulator discharge based on image recognition.

The storage device 403: the storage device 403 stores instructions and data; the storage device 403 is configured to implement the detection method for detecting fault of insulator discharge based on image recognition.

Key points of the present application are:

(1) Efficient Feature Extraction:

The CSTDarknet gradually reduces the size of the feature maps and performs image feature extraction by stacking convolutional layers and Transformer modules. This structure can effectively capture semantic information and local features in the images, providing rich feature representations.

(2) Multi-Scale Feature Fusion:

The PANet module in Neck is configured to fuse the feature maps at different levels. Through up-sampling and feature fusion operations, the PANet can effectively fuse the feature maps from different levels, so as to obtain richer multi-scale feature representations. This feature fusion operation helps to improve the accuracy and robustness of target detection.

(3) Enhanced Attention Mechanism:

The 1D-attention module introduced in the PANet performs self-attention calculations on the channel dimension, spatial vertical dimension and spatial horizontal dimension of the feature maps. This 1D-attention module enhances the attention and response of the model to important features, further improving the performance of target detection.

The beneficial effect of the present application is to improve the accuracy of insulator discharge detection and an applicability of detection scenarios.

The above is only preferred embodiments of the present application and is not intended to limit it. Any modifications, equivalent substitutions, improvements, etc. made within the spirit and principles of the present application shall be included within the scope of protection of the present application.

What is claimed is:

1. A detection method for detecting fault of insulator discharge based on image recognition, comprising the following steps:

S1: building an ultraviolet image dataset for an electrical equipment,

S2: building a neural network model for insulator discharge detection based on and object detection algorithm, namely YOLOV5-T (You Only Look Once version 5), wherein the neural network model for insulator discharge detection based on YOLOV5-T comprises a Cross-stage Partial Network (CBS) module, a Computer Simulation Technology (CST) module, a Concat module, a one dimension attention (1D-attention) module, an Upsample module and a Detect module, S3: training the neural network model for insulator discharge detection based on YOLOV5-T by utilizing the ultraviolet image dataset for the electrical equipment, to obtain a trained neural network model, and S4: inputting images to be recognized into the trained neural network model, to obtain fault detection results, wherein a structure of the neural network model for insulator discharge detection based on YOLOV5-T comprises a Backbone network, a Neck network and a Head network, wherein the Backbone network is configured to extract multi-scale feature maps and comprises:

a first CBS module, a second CBS module, a third CBS module, a fourth CBS module, and a fifth CBS module, wherein each of the first CBS module, the second CBS module, the third CBS module, the fourth CBS module, and the fifth CBS module is configured to extract features of different scales; and a first CST module, a second CST module, a third CST module, and a fourth CST module, wherein each of the first CST module, the second CST module, the third CST module and the fourth CST module is configured to combine local features extracted by a convolutional neural network with a Transformer to fuse global information;

wherein the Backbone network has a connection topology such that: the images to be recognized are input to the first CBS module, an output port of the first CBS module is connected to an input port of the second CBS module, an output port of the second CBS module is connected to an input port of the first CST module, an output port of the first CST module is connected to an input port of the third CBS module, an output port of the third CBS module is connected to an input port of the second CST module, an output port of the second CST module is connected to an input port of the fourth CBS module, an output port of the fourth CBS module is connected to an input port of the third CST module, an output port of the third CST module is connected to an input port of the fifth CBS module, and an output port of the fifth CBS module is connected to an input port of the fourth CST module, and wherein the Neck network is configured to fuse feature maps from different levels and comprises:

a first Concat module, a second Concat module, a third Concat module, and a fourth Concat module, wherein each of the first Concat module, the second Concat module, the third Concat module, the fourth Concat module is configured to concatenate the feature maps from different levels;

a first Upsample module and a second Upsample module, wherein each of first the Upsample module and the second Upsample module is configured to perform up-sampling;

a sixth CBS module, a seventh CBS module, an eighth CBS module, and a ninth CBS module;

a fifth CST module, a sixth CST module, a seventh CST module, and an eighth CST module; and a first 1D-attention module, a second 1D-attention module, and a third 1D-attention module, wherein each of the first 1D-attention module, the second 1D-attention module, and the third 1D-attention module is configured to perform self-attention calculation in a channel dimension, a spatial vertical dimension, and a spatial horizontal dimension of feature maps.

2. The detection method for detecting fault of insulator discharge based on image recognition according to claim 1, wherein the output port of the second CST module is further connected to an input port of the first Concat module, the output port of the third CST module is further connected to an input port of the second Concat module, an output port of the fourth CST module is connected to an input port of the seventh CBS module, an output port of the seventh CBS module is connected to an input port of the second Upsample module, an output port of the second Upsample module is connected to the input port of the second Concat module, an output port of the second Concat module is connected to an input port of the fifth CST module, an output port of the fifth CST module is connected to an input port of the sixth CBS module, an output port of the sixth CBS module is connected to an input port of the first Upsample module, and an output port of the first Upsample module is connected to the input port of the first Concat module, an output port of the first Concat module is connected to an input port of the first 1D-attention module, the output port of the sixth CBS module is further connected to an input port of the second 1D-attention module, the output port of the seventh CBS module is further connected to an input port of the third 1D-attention module, and an output port of the first 1D-attention module is connected to an input port of the sixth CST module, an output port of the sixth CST module is connected to an input port of the eighth CBS module, an output port of the eighth CBS module is connected to an input port of the third Concat module, an output port of the third Concat module is connected to an input port of the seventh CST module, an output port of the seventh CST module is connected to an input port of the ninth CBS module, an output port of the ninth CBS module is connected to an input port of the fourth Concat module, and an output port of the fourth Concat module is connected to an input port of the eighth CST module.

3. The detection method for detecting fault of insulator discharge based on image recognition according to claim 2, wherein the Head network comprises a first Detect module, a second Detect module and a third Detect module.

4. The detection method for detecting fault of insulator discharge based on image recognition according to claim 3, wherein the output port of the sixth CST module is further connected to the first Detect module, the output port of the seventh CST module is further connected to the second Detect module, and an output port of the eighth CST module is connected to the third Detect module.

5. A detection device for detecting fault of insulator discharge based on image recognition, comprising a processor and a memory, wherein executable instructions are stored in the memory, and the processor is configured to load and execute the executable instructions in the memory, to implement the detection method for detecting fault of insulator discharge based on image recognition according to claim 1.

* * * * *